US012515129B2

(12) United States Patent
Feng et al.

(10) Patent No.: US 12,515,129 B2
(45) Date of Patent: Jan. 6, 2026

(54) METHOD AND APPARATUS FOR PERFORMING AN ACTION IN A VIRTUAL ENVIRONMENT

(71) Applicant: Beijing Zitiao Network Technology Co., Ltd., Beijing (CN)

(72) Inventors: Qidi Feng, Beijing (CN); Dao Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 288 days.

(21) Appl. No.: 18/330,504

(22) Filed: Jun. 7, 2023

(65) Prior Publication Data

US 2024/0017172 A1 Jan. 18, 2024

(30) Foreign Application Priority Data

Jul. 18, 2022 (CN) ......................... 202210872231.6

(51) Int. Cl.
*A63F 13/537* (2014.01)
*A63F 13/57* (2014.01)

(52) U.S. Cl.
CPC ............ *A63F 13/537* (2014.09); *A63F 13/57* (2014.09)

(58) Field of Classification Search
CPC ........ A63F 13/537; A63F 13/57; A63F 13/53; A63F 13/5372
See application file for complete search history.

(56) References Cited

U.S. PATENT DOCUMENTS 6,210,273 B1 * 4/2001 Matsuno ................. A63F 13/45 463/31
6,582,299 B1 * 6/2003 Matsuyama ............ A63F 13/53 463/2

(Continued)

FOREIGN PATENT DOCUMENTS

CN 1744933 A 3/2006
CN 101605580 A 12/2009

(Continued)

OTHER PUBLICATIONS

Victor Creed, Unlimited Sneak Attack with Greater Invisibility in Pathfinder Kingmaker, 2018, Youtube.com, pp. 1-2, at https://youtu.be/Tp9ujz61Xw8 (last visited May 20, 2025). (Year: 2018).*

(Continued)

*Primary Examiner* — Steve Rowland
(74) *Attorney, Agent, or Firm* — Alleman Hall & Tuttle LLP

(57) ABSTRACT

A method, apparatus, device, and storage medium for performing an action in a virtual environment are provided. The method comprises: in response to a target object being triggered to perform a target action in the virtual environment, presenting a description information associated with the target action in a first region, the description information indicating a probability event associated with the target action and a target value corresponding to the probability event; presenting, in a second region, an execution value associated with the probability event using a dynamic change of a probability interaction element, the second region being associated with a position of the target object; and controlling the target action to be performed in the virtual environment, wherein a triggering result of the probability event associated with the target action is determined (Continued)

based on a comparison between the execution value and the target value.

14 Claims, 4 Drawing Sheets

(56) References Cited

U.S. PATENT DOCUMENTS

| | | | | |
|---|---|---|---|---|
| 10,434,403 | B2* | 10/2019 | Weng | A63F 13/87 |
| 11,992,766 | B2* | 5/2024 | Saito | A63F 13/65 |
| 2004/0259613 | A1* | 12/2004 | Machida | A63F 13/10 463/1 |
| 2005/0026684 | A1* | 2/2005 | Sumi | A63F 13/45 463/31 |
| 2006/0084509 | A1* | 4/2006 | Novak | A63F 13/30 463/30 |
| 2008/0009346 | A1* | 1/2008 | Jessop | A63F 9/18 463/31 |
| 2008/0102950 | A1* | 5/2008 | Ishii | A63F 13/58 463/31 |
| 2008/0125212 | A1* | 5/2008 | Schofield | G07F 17/32 463/20 |
| 2010/0009733 | A1* | 1/2010 | Garvin | A63F 13/10 463/37 |
| 2012/0329538 | A1* | 12/2012 | Hall | A63F 13/46 463/2 |
| 2013/0072296 | A1* | 3/2013 | Miyazaki | A63F 13/10 463/31 |
| 2014/0031112 | A1* | 1/2014 | Dezaki | A63F 13/77 463/29 |
| 2014/0213356 | A1* | 7/2014 | Iwano | A63F 13/332 463/31 |
| 2014/0221062 | A1* | 8/2014 | Shinoda | A63F 13/847 463/6 |
| 2014/0237392 | A1 | 8/2014 | Hoomani et al. | |
| 2014/0357339 | A1* | 12/2014 | Urushihara | G07F 17/329 463/17 |
| 2015/0038226 | A1* | 2/2015 | Maeda | A63F 13/5375 463/31 |
| 2016/0059130 | A1* | 3/2016 | Shimoda | A63F 13/537 463/31 |
| 2016/0351021 | A1* | 12/2016 | Henrick | G07F 17/3225 |
| 2020/0275070 | A1* | 8/2020 | Ueda | G06T 17/20 |
| 2020/0406137 | A1 | 12/2020 | Song et al. | |
| 2023/0020032 | A1* | 1/2023 | Wang | A63F 13/335 |
| 2025/0135358 | A1* | 5/2025 | Sekiguchi | A63F 13/533 |

FOREIGN PATENT DOCUMENTS

| | | | |
|---|---|---|---|
| CN | 105214309 | A | 1/2016 |
| CN | 110215710 | A | 9/2019 |
| CN | 111973974 | A | 11/2020 |
| CN | 113476825 | A | 10/2021 |
| CN | 113509730 | A | 10/2021 |
| CN | 114130011 | A | 3/2022 |
| CN | 114247141 | A | 3/2022 |
| CN | 114501055 | A | 5/2022 |

OTHER PUBLICATIONS

Xiansen, M., "Detailed explanation of Bude Gate 3 Dice Checking Mechanism," douyou.cm, Available Online at m.doyo.cn/article/407444, Oct. 10, 2020, 8 pages.

"In addition to being able to identify "non-European" problems, what else can dice be used for?", Available Online at baijiahao.baidu.com/s?id=1729536792265698563&wfr=spider&for=pc, Apr. 8, 2022, 16 pages.

China National Intellectual Property Administration, Office Action and Search Report Issued in Application No. 202210872231.6, Apr. 17, 2024, 16 pages.

China National Intellectual Property Administration, Office Action and Search Report Issued in Application No. 202210872231.6, Jun. 28, 2024, 14 pages.

Le, H., "Ultraman Fighting Evolution 0(UFESO", Available Online at https://zhidao.baidu.com/question/695434614414833524.html?fr=search&word=%E5%A5%A5%E7%89%B9%E6%9B%BC%E6%A0%BC%E6%96%97%E8%BF%9B%E5%8C%960+%E8%83%BD%E9%87%8F%E6%9D%A1, Apr. 6, 2020, 3 pages.

* cited by examiner

METHOD AND APPARATUS FOR PERFORMING AN ACTION IN A VIRTUAL ENVIRONMENT

CROSS-REFERENCE TO RELATED APPLICATION(S)

This application claims priority to and benefits of Chinese Patent Application No. 202210872231.6, filed on Jul. 18, 2022, and entitled "Method and apparatus for performing an action in a virtual environment", the entire disclosure of which is hereby incorporated by reference.

TECHNICAL FIELD

Example embodiments of the present disclosure generally relate to the field of computers, in particular to method, apparatus, device and computer-readable storage medium for performing an action in a virtual environment.

BACKGROUND

With the development of computer technology, various forms of electronic devices may greatly enrich people's daily lives. For example, people may use electronic devices for various interactions in a virtual scene.

In some interaction scene, in order to improve the authenticity of the interaction, some interaction actions may be accompanied by probability events (also known as random events). For example, attack behavior in games may be related to a probability event of hitting or not. However, traditional interaction mechanisms may not make operators feel or understand this probability mechanism in the interaction.

SUMMARY

In a first aspect of the present disclosure, a method for performing an action in a virtual environment is provided. The method comprises: in response to a target object being triggered to perform a target action in the virtual environment, presenting a description information associated with the target action in a first region, the description information indicating a probability event associated with the target action and a target value corresponding to the probability event; presenting, in a second region, an execution value associated with the probability event using a dynamic change of a probability interaction element, the second region being associated with a position of the target object; and controlling the target action to be performed in the virtual environment, wherein a triggering result of the probability event associated with the target action is determined based on a comparison between the execution value and the target value.

In a second aspect of the present disclosure, an apparatus for performing an action in a virtual environment is provided. The apparatus comprises a first presentation module, configured to in response to a target object being triggered to perform a target action in the virtual environment, present a description information associated with the target action in a first region, the description information indicating a probability event associated with the target action and a target value corresponding to the probability event; a second presentation module, configured to present, in a second region, an execution value associated with the probability event using a dynamic change of a probability interaction element, the second region being associated with a position of the target object; and a control module, configured to control the target action to be performed in the virtual environment, wherein a triggering result of the probability event associated with the target action is determined based on a comparison between the execution value and the target value.

In a third aspect of the present disclosure, an electronic device is provided. The device includes at least one processing unit; and at least one memory, coupled to at least one processing unit and storing instructions to be performed by at least one processing unit. The method of causing the device to perform the first aspect when the instruction is performed by at least one processing unit.

In a fourth aspect of the present disclosure, a computer-readable storage medium is provided. A computer program is stored on the medium, which, when executed by a processor, implements a method according to the first aspect.

It should be understood that the content described in the summary is neither intended to limit key features or essential features of embodiments of the present disclosure, nor is it used to limit the scope of the present disclosure. Other features of the present disclosure will become easier to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
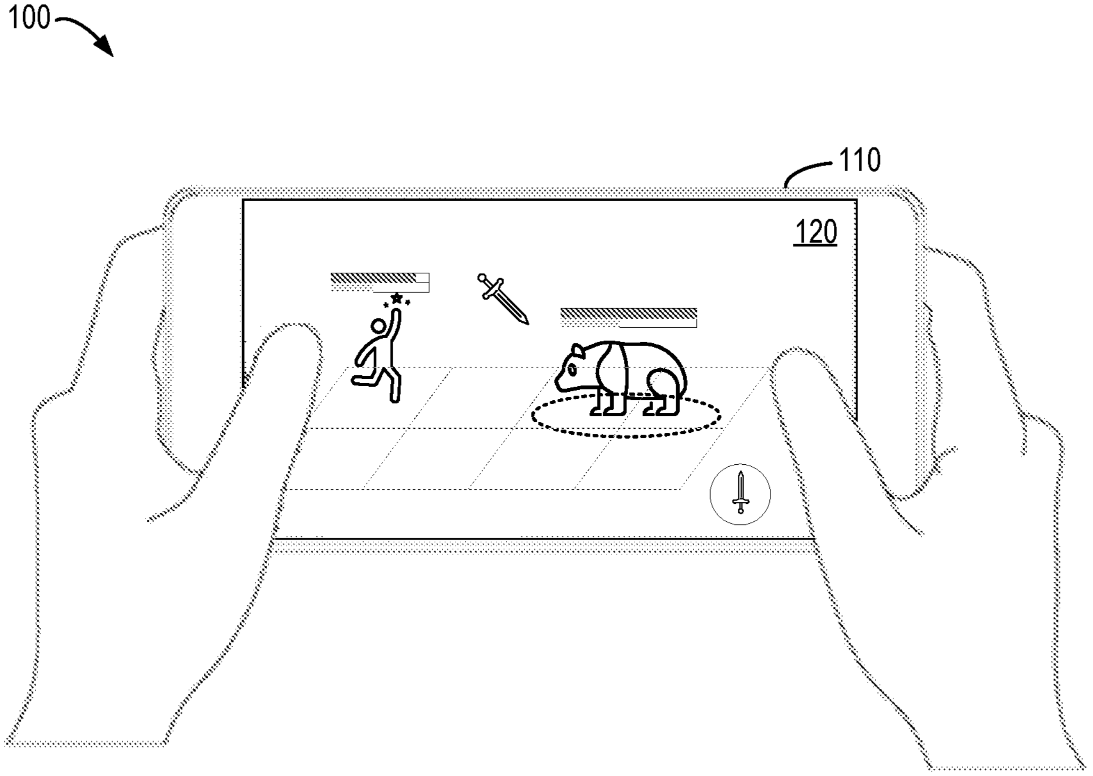
FIG. 1 illustrates a schematic diagram of an example environment in which the embodiments of the present disclosure may be implemented.

Embodiments of the present disclosure will be described in more detail below with reference to the accompanying drawings. Although some embodiments of the present disclosure have been illustrated in the accompanying drawings, it is to be understood that the present disclosure may be implemented in various manners and should not be construed to be limited to embodiments described herein. On the contrary, these embodiments are provided for a more thorough and complete understanding of the present disclosure. It is to be understood that the accompanying drawings and embodiments of the present disclosure are only for the purpose of illustration, rather than limiting the protection scope of the present disclosure.

In the description of the embodiments of the present disclosure, the term "including" and similar terms are to be understood as open terms, that is, "including but not limited to". The term "based on" is to be understood as "based at least in part on". The terms "one embodiment" or "the embodiment" are to be understood as "at least one embodiment". The term "some embodiments" is to be understood as "at least some embodiments". Other definitions, either explicit or implicit, may be included below.

As aforementioned, in the interaction of virtual environments, some interaction behaviors are usually associated with probability mechanisms. Taking games as an example, the release of some skills, for example, may be accompanied by random events that may be triggered by additional special effects (such as freezing effects, burning effects, etc.).

Traditional interaction processes usually only allow operators to understand the results of random events, without being able to understand the random mechanisms related to the interaction process, which greatly affects the user's interaction experience.

The embodiments of the present disclosure propose a subject matter for performing an action in a virtual environment. According to the subject matter, when a target object is triggered to perform a target action in a virtual environment, a description information associated with the target action may be presented in a first region of a interface. The description information may be used to indicate, for example, a probability event associated with the target action and a target value corresponding to the probability event. Further, a dynamic change of a probability interaction element may be used in a second region of the interface to present an execution value associated with the probability event, wherein the second region is associated with a position of the target object.

Further, the target action may be controlled to be performed in the virtual environment, wherein a triggering result of the probability event associated with the target action is determined based on a comparison between the execution value and the target value. For example, a probability event may be triggered when the execution value is greater than the target value.

Therefore, the embodiments of the present disclosure may intuitively represent the probability mechanism of the interaction process through dynamic probability interaction elements, enabling users to understand a triggering principle of probability events, thereby improving the interaction experience of the virtual environment.

The following further describes in detail the various example implementations of the subject matter in conjunction with the accompanying drawings. In order to illustrate the principles and ideas of the embodiments of the present disclosure, some descriptions below will refer to the field of gaming. However, it will be understood that this is only illustrative and is not intended to limit the scope of the present disclosure in any way. The embodiments of the present disclosure may be applied to various fields such as emulation, simulation, virtual reality, augmented reality, etc.

Example Environment

Firstly, refer to FIG. 1, which schematically illustrates an example environment 100 in which the exemplary implementation according to the present disclosure may be implemented. As shown in FIG. 1, the example environment 100 may include an electronic device 110.

In some embodiments, as shown in FIG. 1, the electronic device 110 may, for example, include a portable device of an appropriate type, which may, for example, support a user to hold with both hands for various interactive operations. Such electronic device 110 may include, for example, but not limited to: a smart phone, a tablet computer, a personal digital assistant, portable game terminals, and the like.

Such electronic device 110 may include, for example, appropriate types of sensors for detecting user gesture. For example, the electronic device 110 may include a touch screen for detecting various types of gestures made by users on the touch screen. Alternatively or additionally, the electronic device 110 may also include other appropriate types of sensing devices such as a proximity sensor to detect various types of gestures made by users within a predetermined distance above the screen.

It is to be understood that although the electronic device 110 is shown as a portable device in FIG. 1, this is only exemplary. In some other embodiments, the electronic device 110 may also be in other appropriate forms. For example, electronic device 110 may include a display device for display and a computing device for calculation, and the display device and the computing device may, for example, be physically coupled or separated.

For example, the electronic device 110 may include a display screen for screen display, and a game console for screen rendering and game control.

In this scene, the electronic device 110 may, for example, use other appropriate input devices to achieve interaction. For example, the electronic device 110 may achieve interaction through appropriate interactive devices such as a communication coupled keyboard, mouse, joystick, game controller, etc.

Continuing with reference to FIG. 1, as described in FIG. 1, the electronic device 110 may, for example, present a graphical interface 120, which may, for example, present a corresponding virtual environment. Exemplarily, the graphical interface 120 may be a game application interface to present corresponding game scenes. Alternatively, the graphical interface 120 may also be other appropriate types of interactive interface that may support users to control the execution of corresponding actions by a virtual object in the virtual environment.

The following will provide a detailed introduction to the specific process of controlling the execution of actions in a virtual environment.

Example Interaction

In order to more intuitively represent the probability mechanism in the interaction process of the virtual environment, the embodiments of the present disclosure may enable users to understand the principle of whether the corresponding probability event is triggered by presenting probability interaction elements.

Figure 2A:
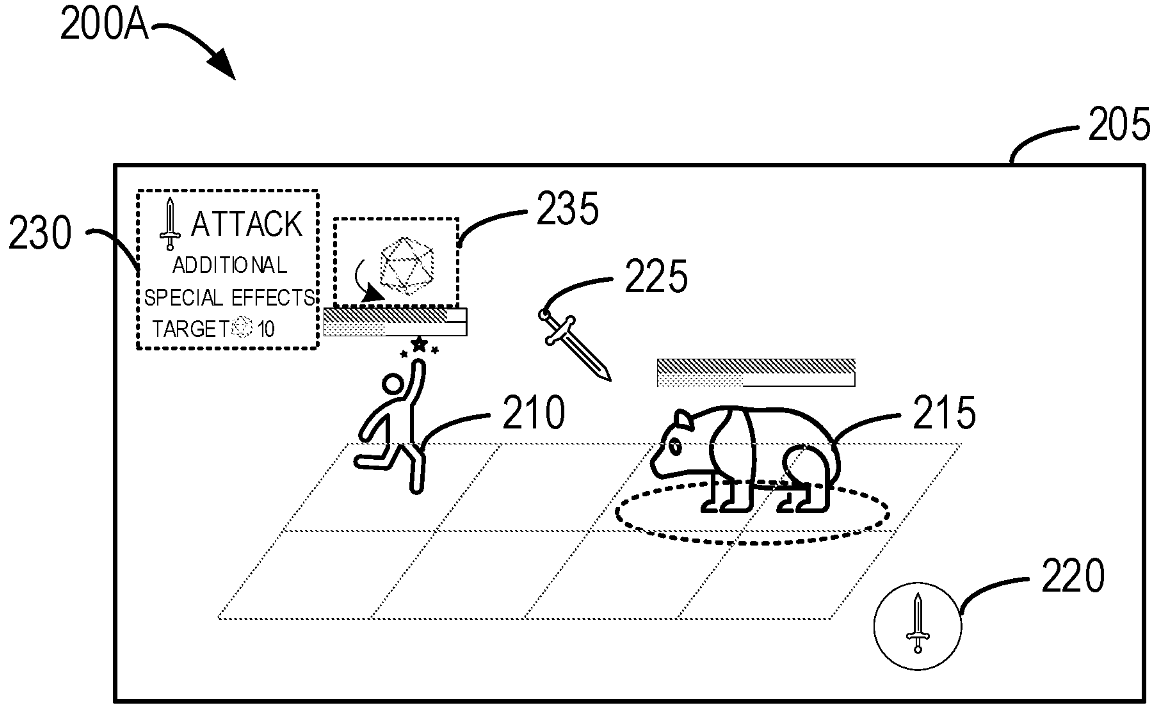
FIG. 2A, FIG. 2B, and FIG. 2C illustrate schematic diagrams of performing an action in a virtual environment according to some embodiments of the present disclosure.

FIG. 2A shows a schematic diagram 200A of performing an action in a virtual environment according to some embodiments of the present disclosure. In some embodiments, the electronic device 110 may present an interface 205 as shown in FIG. 2A. As introduced earlier, such interface 205 may include, for example, a graphical interface associated with the virtual environment. Such virtual environments may include, but are not limited to, various types of game environments, simulation environments, or emulation environments.

As shown in FIG. 2A, the interface 205 may include the target object 210. Exemplarily, the target object 210 may be, for example, an appropriate object that users may control in the virtual environment, e.g., a game character.

In some embodiments, the target object 210 may be triggered, for example, to perform the target action in the virtual environment. Exemplarily, the electronic device 110 may receive a user's selection of a control 220 to determine that the target object 210 is triggered to perform an attack action 225 against another object 215 in the virtual environment.

In some embodiments, the control 220 may have, for example, different presentation styles. For example, the control 220 may be presented as a button style as shown in FIG. 2A, which may trigger the target action upon receiving a click operation. Alternatively, the control 220 may also be presented as a card style that, upon receiving a drag and drop operation, may trigger the target action. It should be understood that other appropriate styles are also possible.

In some embodiments, the target object 210 may also be automatically triggered to execute the target action. Exemplarily, when the target object 210 moves to a predetermined position in the virtual environment, it may be automatically triggered the attack action 225 against the other object 215.

In some embodiments, the electronic device 110 may determine, for example, that a target action (e.g., the attack action 225) is associated with a probability event. For example, taking the attack action 225 as an example, it may be, for example, associated with the probability event of "additional special effects", that is, in an attack action against another object 225, it is possible to attach the corresponding attack special effects.

As shown in FIG. 2A, the electronic device 110 may present a description information of the target action in a first area 230 of interface 205. Such description information may be used to, for example, indicate a probability event associated with the target action. Additionally, such description information may also indicate, for example, a target value corresponding to the probability event.

Taking FIG. 2A as an example, the electronic device 110 may present a graphical element or a text element corresponding to the target action in the first region 230 to perform the currently performed a target action as an "attack".

Additionally, the electronic device 110 may also present the text element corresponding to probability events "additional effects" in the first region 230. As a result, the electronic device 110 may enable users to intuitively understand that the performed target action may trigger probability events "additional special effects".

Further, the electronic device 110 may also present the target value corresponding to the probability event in the first region 230. For example, as shown in FIG. 2A, the electronic device 110 may present a target value of "10" to indicate that the probability event may only be triggered if this value is reached.

The target value "10" is shown in FIG. 2A as presented in text format, and other appropriate presentation formats are also feasible. For example, the electronic device 110 may use a number of points on a certain side of a dice to represent the target value.

In some embodiments, the electronic device 110 may also present probabilistic interaction elements in a second region 235 of the interface 205. As shown in FIG. 2A, after the target object 210 is triggered to perform the target action, the electronic device 110 may present, for example, a dynamic change of the probability interaction element above the position of the target object 210.

Exemplarily, such dynamic changes may include other appropriate shape or appearance changes such as rolling and flipping of probability interaction elements to indicate a determination process of an execution value. In some embodiments, such probability interaction elements may include, for example, one or more dice of appropriate shape.

In some embodiments, the dynamic change of the probability interaction element may last for a predetermined length of time. For example, the dynamic change of the probability interaction is always, for example, 1 second in duration.

Alternatively, the dynamic change of the probability interaction element may also stop in response to the user's interaction. For example, the dynamic change of probability interaction elements may continue after detecting the shaking of the user with respect to the electronic device 205 and terminate the dynamic change after stopping shaking.

In some embodiments, the position of the second region 235 in the interface 205 may be associated with the position of the target object 210 in the interface 205. For example, the second region 235 may always be set above the object 210.

Further, at the end or predetermined time before the dynamic change of probability interaction elements, the electronic device 110 may present the execution value associated with the probability event. In some embodiments, the determination of the execution value may be based on the user's interaction with electronic device 205 (e.g., shaking).

In some embodiments, the determination of execution values may also be determined based on other appropriate mechanisms. For example, the determination of execution values may be comprehensively determined by considering various attributes (e.g., level) of the target object in the virtual environment and/or various attributes of another object in the virtual environment. This disclosure is not intended to limit the mechanism for determining the execution value.

Further, the electronic device 110 may present execution values in association with probability interaction elements in the second region 205. Specifically, the electronic device 110 may determine a style in which the execution value is presented based on, for example, a comparison between the execution value and the target value.

For example, for different situations where the execution value is less than the target value and the execution value is greater than or equal to the target value, the electronic device 110 may use different styles to present the execution value.

Figure 2B:
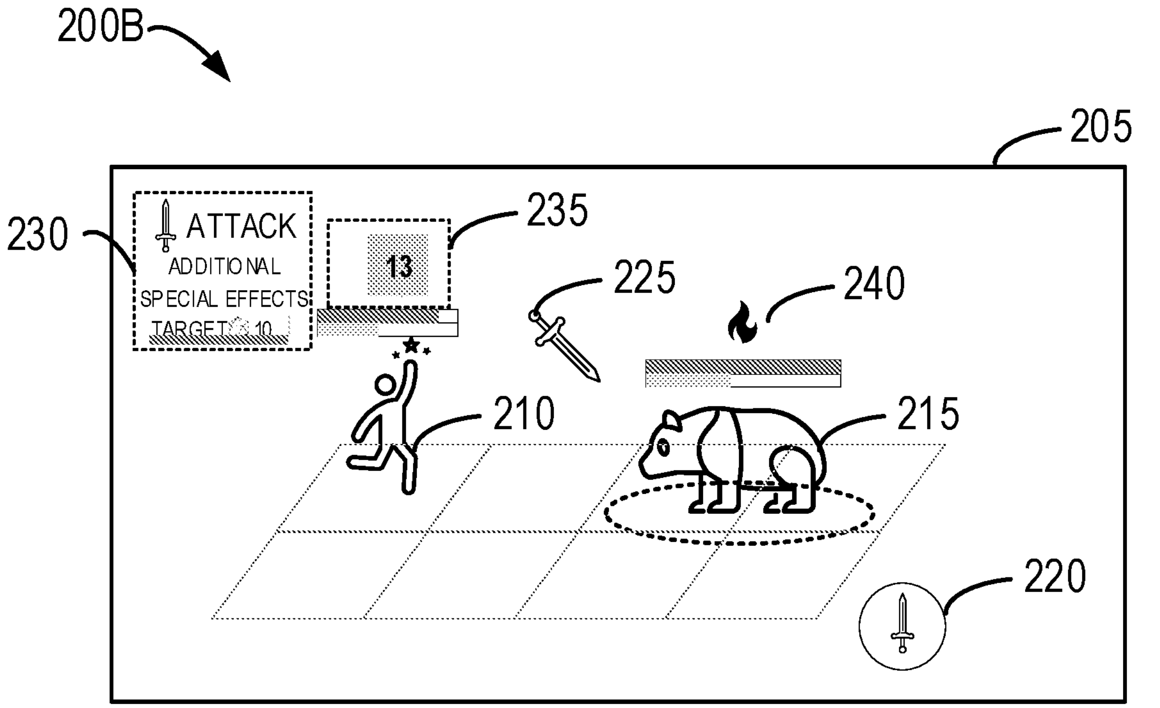

FIG. 2B illustrates a schematic diagram 200B of performing an action in a virtual environment according to some embodiments of the present disclosure. In some embodiments, if the execution value is greater than or equal to the target value, the electronic device 110 may present an interface as shown in FIG. 2B.

As shown in FIG. 2B, if the electronic device 110 determines that the execution value (e.g., 13) is greater than the target value (e.g., 10), the electronic device 110 may present, for example, the target value in association with probability interaction elements in the second region 235.

Additionally, as shown in FIG. 2B, the electronic device 110 may also cause probabilistic interaction elements to present a change in a shape, a size, a color, and/or a brightness when determining that the execution value is greater than or equal to the target value. For example, the dice in the second region 235 may change from an initial first color (e.g., black) to a second color (e.g., green).

Further, the electronic device 110 may also change the display style of the description information in the first region 230 to indicate that the execution value is greater than or equal to the target value.

Exemplarily, as shown in FIG. 2B, the electronic device 110 may cause the changes in properties, size, color, and/or brightness of the text element or the graphic element in the description information. For example, the electronic device

110 may highlight the text element or the graphic element associated with the target value in the first region 230 to indicate that the target value has been reached.

In some embodiments, the electronic device 110 may also present another probability interaction element (e.g., dice) in association with the target value in the first region 230, which may be, for example, a static graphic element. When determining that the execution value is greater than or equal to the target value, the electronic device 110 may also cause the dice in the first region 230 to change from the initial first color (e.g., black) to the second color (e.g., green).

Further, the electronic device 110 may control the target action to be performed in the virtual environment. This execution may indicate that the probability event associated with the target action is triggered.

For example, as shown in FIG. 2B, the electronic device 110 may present a graphic element 240 above the other object 215 to indicate that the attack action 225 successfully triggered additional special effects (e.g., combustion).

In some embodiments, the electronic device 110 may present different information when the execution value is less than the target value.

Figure 2C:
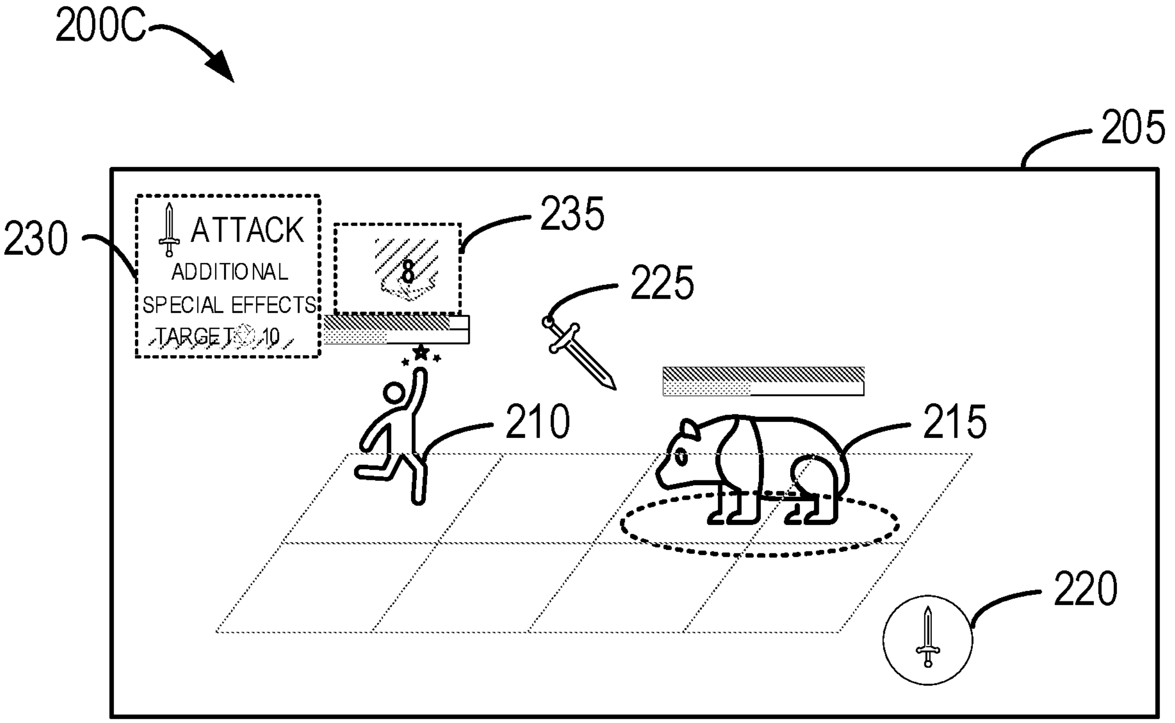

FIG. 2C illustrates a schematic diagram 200C of performing an action in a virtual environment according to some embodiments of the present disclosure. In some embodiments, if the execution value is less than the target value, the electronic device 110 may present an interface as shown in FIG. 2C.

As shown in FIG. 2C, if the electronic device 110 determines that the execution value (e.g., 8) is greater than the target value (e.g., 10), the electronic device 110 may present, for example, the target value in association with probability interaction elements in the second region 235.

Additionally, as shown in FIG. 2C, the electronic device 110 may also cause the probability interaction element to present changes in a shape, size, color, and/or brightness when determining that the execution value is less than the target value. For example, the dice in the second region 235 may change from an initial first color (e.g., black) to a second color (e.g., red).

Further, the electronic device 110 may also change a display style of the description information in the first region 230 to indicate that the execution value is less than the target value.

Exemplarily, as shown in FIG. 2C, the electronic device 110 may cause the changes in properties, size, color, and/or brightness of the text element or the graphic element in the description information. For example, the electronic device 110 may gray out the text element or the graphic element associated with the target value in the first region 230 to indicate that the target value has not been reached.

In some embodiments, the electronic device 110 may also present another probability interaction element (e.g., dice) in association with the target value in the first region 230, which may be, for example, a static graphic element. When determining that the execution value is less than the target value, the electronic device 110 may also cause a change in the shape of the dice in the first region 230, for example, presenting a split dynamic effect.

Further, the electronic device 110 may control the target action to be performed in the virtual environment. This execution may indicate that the probability event associated with the target action has not been triggered.

In this way, the embodiments of the present disclosure can intuitively represent the probability mechanism in the interaction process through probability interaction elements and enable users to intuitively understand the results of probability events, thereby improving the friendliness of the interaction.

As discussed above, the target object may be automatically triggered to perform the target action. In some embodiments, the electronic device 110 may also intuitively represent a object targeted by the target action through a graphical information.

Figure 3:
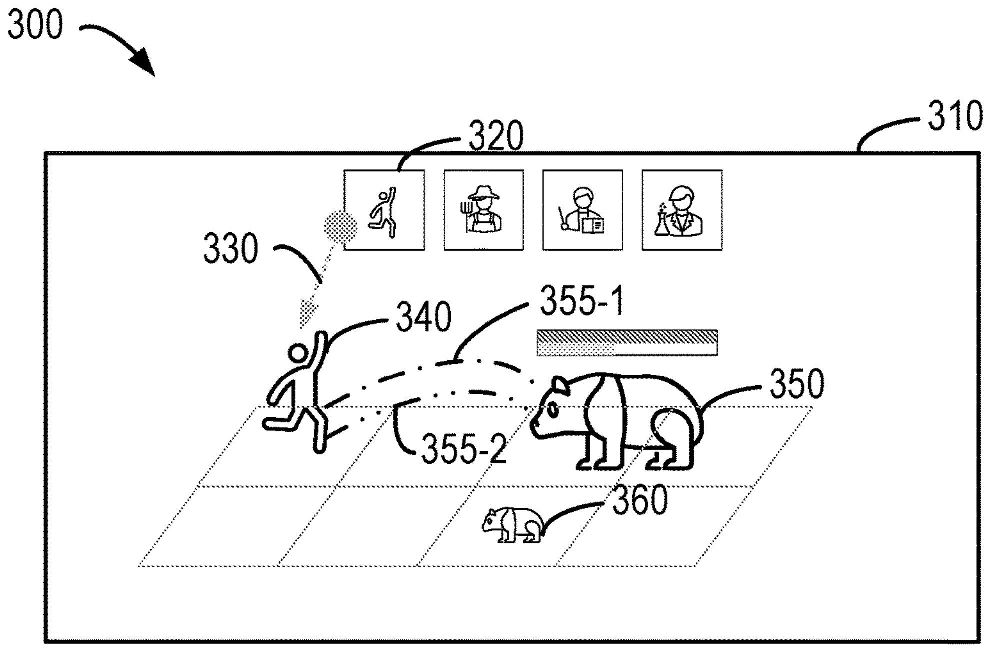
FIG. 3 illustrates a schematic diagram of performing an action in a virtual environment according to other embodiments of the present disclosure.

FIG. 3 illustrates a schematic diagram 300 of performing an action in a virtual environment according to other embodiments of the present disclosure. As shown in FIG. 3, the electronic device 110 may present, for example, an interface 310, which may allow users to add new objects during a preparation stage or a process of a combat.

As shown in FIG. 3, the interface 310 may present a set of graphic elements 310 corresponding to different types of objects. When receiving an operation 330 of dragging the graphic element 310 to the first position in the virtual scene, the electronic device 310 presents an object 340 corresponding to the graphic element 310 at the first position.

As discussed above, the object 340 may be automatically triggered to perform target actions in the virtual environment. In order to provide users with a clearer understanding of the object targeted by the target action, the electronic device 110 may determine that the object 340 will be triggered to perform a target action (e.g., an attack action) against an object 350 based on the first position of the object 340 and other positions associated with the first position (e.g., a position within a predetermined distance).

Exemplarily, as shown in FIG. 3, the electronic device 110 may determine based on the first position of the object 340 and the positions of the object 350 and an object 360, after the user places the object 340 in the first position, that it will automatically trigger a target action for the object 350.

In some embodiments, the electronic device 110 may also indicate the association of different objects in a virtual scene by connecting elements. Exemplarily, as shown in FIG. 3, during the combat layout phase, users may, for example, drag and drop the object 340 to a predetermined location. Further, the electronic device 110 may present connection elements between the object 340 and the object 350, for example, a connection element 355-1 and/or a connection element 355-2.

Exemplarily, the connection element 355-1 may be used to indicate that the object 350 will be determined as the target of a predetermined action (e.g., it may be the same or different from the target action) of the object 340. For example, the connection element 355-1 may indicate that the object 340 will perform a normal attack on the object 350.

Exemplarily, the element 355-2 may be used to indicate that the object 340 will be determined as the target of a predetermined action of the object 350 (e.g., it may be the same or different from the target action). For example, the connection element 355-2 may indicate that the object 350 will release predetermined skills on the object 340.

In some embodiments, the connection element 355-1 and/or the connection element 355-2 may also indicate hate mechanisms in virtual environments. For example, the connection element 355-1 may indicate that the highest hate object of the object 340 is the object 350, and the object 340 will preferentially perform attack-related actions against the object 350. Similarly, the connection element 355-2 may indicate that the highest hate object of the object 350 is the object 340, and the object 350 will preferentially perform attack-related actions against the object 340.

In this way, the embodiments of the present disclosure may more intuitively represent the relationship of objects in the virtual environment, thereby facilitating users to perform more accurate control.

Example Process

Figure 4:
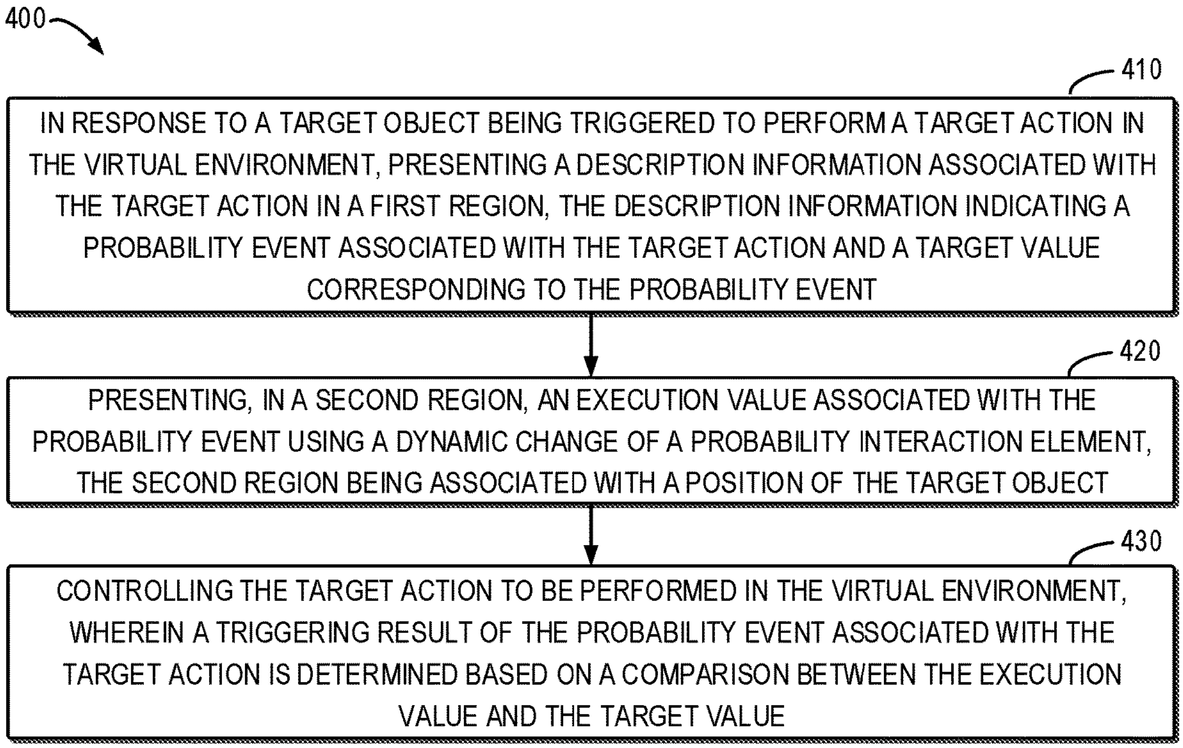
FIG. 4 illustrates a flowchart of an example process of performing an action in a virtual environment according to some embodiments of the present disclosure.

FIG. 4 illustrates a flowchart of a process 400 of performing an action in a virtual environment according to some embodiments of the present disclosure. Exemplarily, process 400 may be independently implemented by electronic device 110 in FIG. 1, or by a combination of electronic device 110 and other computing devices. For the convenience of discussion, process 400 will be described in combination with FIG. 1.

As shown in FIG. 4, in block 410, in response to a target object being triggered to perform a target action in the virtual environment, electronic device 110 presents a description information associated with the target action in a first region, the description information indicating a probability event associated with the target action and a target value corresponding to the probability event.

In block 420, electronic device 110 presents, in a second region, an execution value associated with the probability event using a dynamic change of a probability interaction element, the second region being associated with a position of the target object.

In block 430, electronic device 110 controls the target action to be performed in the virtual environment, wherein a triggering result of the probability event associated with the target action is determined based on a comparison between the execution value and the target value.

In some embodiments, presenting the execution value associated with the probability event in the second region comprises: presenting the dynamic change of the probability interaction element in the second region to indicate a determination process of the execution value; and presenting the execution value in association with the probability interaction element, wherein a presentation style of the execution value is related to whether the execution value is less than the target value.

In some embodiments, electronic device 110 may further, in response to the execution value being greater than or equal to the target value, determine that the probability event is triggered.

In some embodiments, electronic device 110 may further, in response to the execution value being less than the target value, determine that the probability event is not triggered.

In some embodiments, the probability interaction element is a first probability interaction element, and the first region further comprises a second probability interaction element associated with the target value, electronic device 110 may further: in response to the execution value being greater than or equal to the target value, causing the second probability interaction element to present a first change to indicate that the probability event is triggered; or in response to the execution value being less than the target value, causing the second probability interaction element to present a second change to indicate that the probability event is not triggered.

In some embodiments, the first change or the second change comprises a change of at least one of: a shape, a size, a color, or a brightness.

In some embodiments, electronic device 110 may further in response to the target object being moved to a first position in the virtual environment, presenting a connection element associated with the target object and another object, the connection element indicating: the other object is determined as a target of a first action of the target object; and/or the target object is determined as a target of a second action of the other object.

Example Apparatus and Equipment

Figure 5:
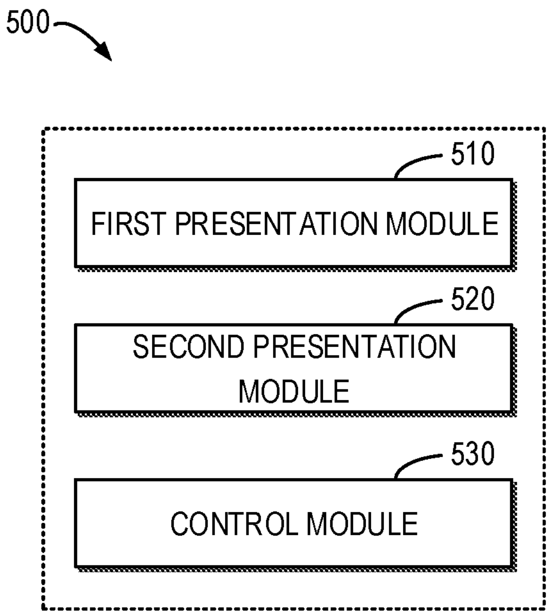
FIG. 5 illustrates a block diagram of an apparatus for performing an action in a virtual environment according to some embodiments of the present disclosure.

The embodiments of the present disclosure further provide corresponding devices for implementing the above methods or processes. FIG. 5 illustrates a schematic structural block diagram of an apparatus 500 for performing an action in a virtual environment according to some embodiments of the present disclosure.

As shown in FIG. 5, apparatus 500 comprises a first presentation module 510, configured to in response to a target object being triggered to perform a target action in the virtual environment, present a description information associated with the target action in a first region, the description information indicating a probability event associated with the target action and a target value corresponding to the probability event.

The apparatus 500 further comprises a second presentation module 520, configured to present, in a second region, an execution value associated with the probability event using a dynamic change of a probability interaction element, the second region being associated with a position of the target object.

The apparatus 500 further comprises a control module 530, configured to control the target action to be performed in the virtual environment, wherein a triggering result of the probability event associated with the target action is determined based on a comparison between the execution value and the target value.

In some embodiments, the second presentation module 520 is further configured to present the dynamic change of the probability interaction element in the second region to indicate a determination process of the execution value; and present the execution value in association with the probability interaction element, wherein a presentation style of the execution value is related to whether the execution value is less than the target value.

In some embodiments, control module 530 is further configured to in response to the execution value being greater than or equal to the target value, determine that the probability event is triggered.

In some embodiments, control module 530 is further configured to in response to the execution value being less than the target value, determine that the probability event is not triggered.

In some embodiments, the probability interaction element is a first probability interaction element, and the first region further comprises a second probability interaction element associated with the target value. The first presentation module 510 is further configured to: in response to the execution value being greater than or equal to the target value, causing the second probability interaction element to present a first change to indicate that the probability event is triggered; or in response to the execution value being less than the target value, causing the second probability interaction element to present a second change to indicate that the probability event is not triggered.

In some embodiments, the first change or the second change comprises a change of at least one of: a shape, a size, a color, or a brightness.

In some embodiments, control module 530 is further configured to in response to the target object being moved to a first position in the virtual environment, present a connection element associated with the target object and another object, the connection element indicating: the other object is determined as a target of a first action of the target object; and/or the target object is determined as a target of a second action of the other object.

The units included in apparatus 500 may be implemented in various ways, including software, hardware, firmware, or any combination thereof. In some embodiments, one or more units may be implemented using software and/or firmware, for example, machine executable instructions stored on storage medium. In addition to machine executable instructions or as an alternative, some or all units in apparatus 500 may be implemented at least in part by one or more hardware logic components. As an example rather than a limitation, the demonstration types of hardware logic components that may be used include field programmable gate array (FPGA), application specific integrated circuit (ASIC), application specific standard (ASSP), system on chip (SOC), complex programmable logic device (CPLD), and so on.

Figure 6:
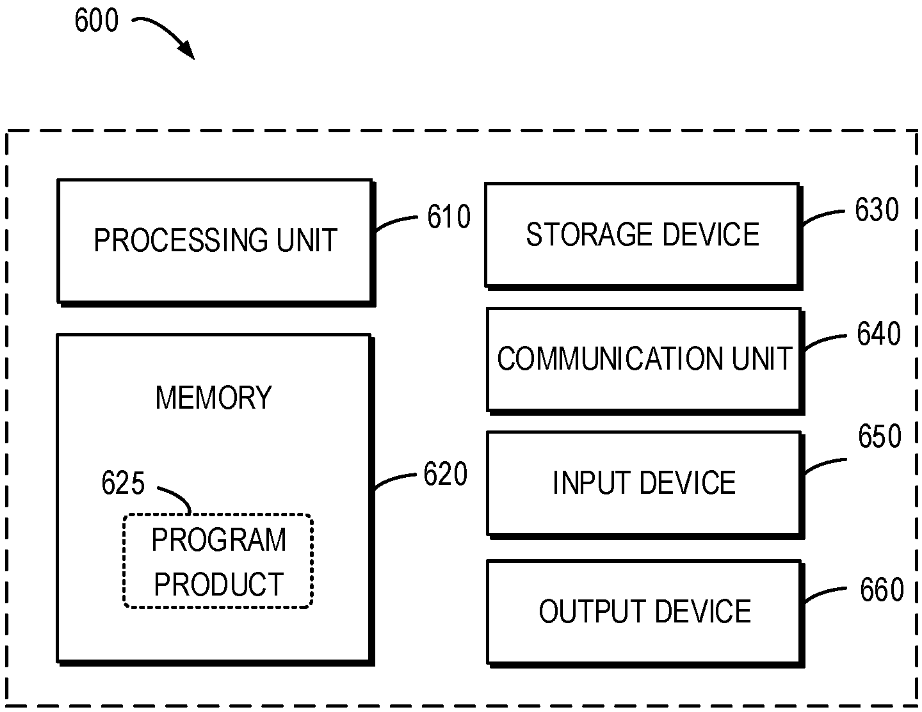
FIG. 6 illustrates a block diagram of a device in which one or more embodiments of the present disclosure may be implemented.

FIG. 6 illustrates a block diagram of a computing device/server 600 in which one or more embodiments of the present disclosure may be implemented. It is to be understood that the computing device/server 600 shown in FIG. 6 is only exemplary and should not suggest any limitation to the functionality and scope of the embodiments described herein.

As shown in FIG. 6, the computing device/server 600 is in the form of a universal computing device. The components of computing device/server 600 may include, but are not limited to, one or more processors or processing units 610, a memory 620, a storage device 630, one or more communication units 640, one or more input devices 660, and one or more output devices 660. The processing unit 610 may be a real or virtual processor and may perform various processes according to programs stored in the memory 620. In a multiprocessor system, a plurality of processing units performs computer executable instructions in parallel to improve the parallel processing capability of computing device/server 600.

The computing device/server 600 typically includes a plurality of computer storage media. Such media may be any available media accessible by the computing device/server 600, including but not limited to volatile and non-volatile media, detachable and non-detachable media. Memory 620 may be volatile memory (such as a register, a cache, a random access memory (RAM)), a non-volatile memory (such as read-only memory (ROM), electrically erasable programmable read-only memory (EEPROM), flash memory), or some combination thereof. The storage device 630 may be a detachable or non-detachable medium, and may include machine-readable medium, such as a flash drive, a disk, or any other medium that may be used to store information and/or data (e. g., training data for training) and may be accessed within the computing device/server 600.

The computing device/server 600 may further include additional detachable/non-detachable, volatile/non-volatile storage media. Although not shown in FIG. 6, there may be provided a disk drive for reading from or writing into a detachable, non-volatile disk (e.g., a “floppy disk”) and an optical disk drive for reading from or writing into a detachable, non-volatile disk. In these cases, each driver may be connected to a bus (not shown) via one or more data medium interfaces. Memory 620 may include computer program product 625, which has one or more program modules configured to perform various methods or actions of various embodiments of the present disclosure.

The communication unit 640 implements communication with another computing devices through a communication medium. Additionally, the functions of the components of the computing device/server 600 may be implemented by a single computing cluster or a plurality of computing machines, which may communicate through communication connections. Therefore, computing device/server 600 may operate in a networked environment using logical connections to one or more other servers, network personal computers (PCs), or another network node.

Input device 650 may be one or more input devices, for example, a mouse, keyboard, a trackball, etc. The output device 660 may be one or more output devices, for example, a display, a speaker, a printer, etc. The computing device/server 600 may also communicate with one or more external devices (not shown) through the communication unit 640 as needed, such as storage devices, display devices, etc., to communicate with one or more devices that enable users to interact with the computing device/server 600, or communicate with any device (e.g., a network card, modem, etc.) that enables the computing device/server 600 to communicate with one or more other computing devices. Such communication may be performed via an input/output (I/O) interface (not shown).

According to exemplary implementations of the present disclosure, a computer-readable storage medium is provided, on which one or more computer instructions are stored, wherein one or more computer instructions are performed by a processor to implement the method described above.

Various aspects of the present disclosure are described herein with reference to the flowchart and/or block diagram of the method, apparatus (system) and computer program product implemented in accordance with the present disclosure. It is to be understood that each block in the flowchart and/or block diagram, as well as the combination of each block in the flowchart and/or block diagram, may be implemented by computer-readable program instructions.

These computer-readable program instructions may be provided to a processing unit of a general-purpose computer, a specialized computer, or other programmable data processing apparatus to produce a machine, such that the instructions, which perform via the processing unit of the computer or other programmable data processing apparatus, generates means that implement the functions/actions specified in one or more blocks in the flowchart and/or block diagram. These computer-readable program instructions may also be stored in a computer-readable storage medium, which enables a computer, a programmable data processing apparatus, and/or other devices to function in a particular manner, thereby the computer-readable medium having the instructions comprises an article of manufacture including instructions which implement various aspects of the functions/actions specified in one or more blocks of the flowchart and/or block diagram.

These computer-readable program instructions may also be loaded onto a computer, other programmable data processing apparatus, or other devices to perform a series of operational steps on a computer, other programmable data processing apparatus, or other device, in order to generate a computer implementation process, thereby enabling the execution of a series of operational steps on the computer, other programmable data processing apparatus, or other device, the instructions performed on other devices implement the functions/actions specified in one or more blocks of the flowchart and/or block diagram.

The flowchart and block diagram in the figure illustrate a possible architecture, functionality, and operation of possible implementations of systems, methods, and computer program products in accordance with various implementations of the present disclosure. At this point, each block in a flowchart or block diagram may represent a module, program segment, or a portion of instruction, which comprises one or more executable instructions for implementing a specified logical function. In some alternative implementations, the functions indicated in the block may also occur in a different order than those indicated in the figure. For example, two blocks shown in succession may, in fact, be performed substantially concurrently, and sometimes they may also be performed in the reverse order, depending on the functionality involved. It should also be noted that each block of the block diagram and/or flowchart, as well as the combination of blocks in the block diagram and/or flowchart, may be implemented by dedicated hardware-based systems that perform specified functionality or actions, or may be implemented by a combination of dedicated hardware and computer instructions.

The above has already described the various implementations of the present disclosure, and the above illustration is exemplary, not exhaustive, and is not limited to the disclosed implementations. Many modifications and variations are apparent to those of ordinary skill in the art without deviating from the scope and spirit of the described implementations. The selection of terms used herein aims to best explain the principles of implementation, practical applications, or improvements over technology in the market, or to enable other ordinary technical personnel in the field of this technology to understand the various implementations disclosed herein.

What is claimed is:

1. A method for performing an action in a virtual environment, comprising:

in response to a target object being triggered to perform a target action in the virtual environment, presenting description information associated with the target action in a first region, the description information indicating a probability event associated with the target action and a target value corresponding to the probability event;

presenting, in a second region, an execution value associated with the probability event using a dynamic change of a first probability interaction element, the second region being associated with a position of the target object; and controlling the target action to be performed in the virtual environment, wherein a triggering result of the probability event associated with the target action is determined based on a comparison between the execution value and the target value, wherein the first region further comprises a second probability interaction element associated with the target value, and the method further comprises:

causing, in response to the execution value being greater than or equal to the target value, the second probability interaction element to present a first change to indicate that the probability event is triggered; or causing, in response to the execution value being less than the target value, the second probability interaction element to present a second change to indicate that the probability event is not triggered.

2. The method according to claim 1, wherein presenting the execution value associated with the probability event in the second region comprises:

presenting the dynamic change of the first probability interaction element in the second region to indicate a determination process of the execution value; and presenting the execution value in association with the first probability interaction element, wherein a presentation style of the execution value is related to whether the execution value is less than the target value.

3. The method according to claim 1, wherein the first change or the second change comprises a change of at least one of: a shape, a size, a color, or a brightness.

4. The method according to claim 1, further comprising:

in response to the target object being moved to a first position in the virtual environment, presenting a connection element associated with the target object and another object, the connection element indicating: the other object is determined as a target of a first action of the target object; and/or the target object is determined as a target of a second action of the other object.

5. The method according to claim 1, wherein the first probability interaction element comprises a dice.

6. An electronic device, comprising:

at least one processing unit; and at least one memory, coupled to the at least one processing unit and storing instructions to be performed by the at least one processing unit, the instructions, when performed by the at least one processing unit, causing the electronic device to perform a method for performing an action in a virtual environment, the method comprising:

in response to a target object being triggered to perform a target action in the virtual environment, presenting description information associated with the target action in a first region, the description information indicating a probability event associated with the target action and a target value corresponding to the probability event;

presenting, in a second region, an execution value associated with the probability event using a dynamic change of a first probability interaction element, the second region being associated with a position of the target object; and controlling the target action to be performed in the virtual environment, wherein a triggering result of the probability event associated with the target action is determined based on a comparison between the execution value and the target value, wherein the first region further comprises a second probability interaction element associated with the target value, and the method further comprises:

causing, in response to the execution value being greater than or equal to the target value, the second probability interaction element to present a first change to indicate that the probability event is triggered; or causing, in response to the execution value being less than the target value, the second probability interaction element to present a second change to indicate that the probability event is not triggered.

7. The electronic device according to claim 6, wherein the presenting the execution value associated with the probability event in the second region comprises:

presenting the dynamic change of the first probability interaction element in the second region to indicate a determination process of the execution value; and presenting the execution value in association with the first probability interaction element, wherein a presentation style of the execution value is related to whether the execution value is less than the target value.

8. The electronic device according to claim 6, wherein the first change or the second change comprises a change of at least one of: a shape, a size, a color, or a brightness.

9. The electronic device according to claim 6, wherein the method further comprises:

in response to the target object being moved to a first position in the virtual environment, presenting a connection element associated with the target object and another object, the connection element indicating: the other object is determined as a target of a first action of the target object; and/or the target object is determined as a target of a second action of the other object.

10. The electronic device according to claim 6, wherein the first probability interaction element comprises a dice.

11. A computer-readable storage medium, with a computer program stored thereon, the computer program being executed by a processor to implement a method for performing an action in a virtual environment, the method comprising:

in response to a target object being triggered to perform a target action in the virtual environment, presenting description information associated with the target action in a first region, the description information indicating a probability event associated with the target action and a target value corresponding to the probability event;

presenting, in a second region, an execution value associated with the probability event using a dynamic change of a first probability interaction element, the second region being associated with a position of the target object; and controlling the target action to be performed in the virtual environment, wherein a triggering result of the probability event associated with the target action is determined based on a comparison between the execution value and the target value, wherein the first region further comprises a second probability interaction element associated with the target value, and the method further comprises:

causing, in response to the execution value being greater than or equal to the target value, the second probability interaction element to present a first change to indicate that the probability event is triggered; or causing, in response to the execution value being less than the target value, the second probability interaction element to present a second change to indicate that the probability event is not triggered.

12. The computer-readable storage medium according to claim 11, wherein the presenting the execution value associated with the probability event in the second region comprises:

presenting the dynamic change of the first probability interaction element in the second region to indicate a determination process of the execution value; and presenting the execution value in association with the first probability interaction element, wherein a presentation style of the execution value is related to whether the execution value is less than the target value.

13. The computer-readable storage medium according to claim 11, wherein the method further comprises:

in response to the target object being moved to a first position in the virtual environment, presenting a connection element associated with the target object and another object, the connection element indicating: the other object is determined as a target of a first action of the target object; and/or the target object is determined as a target of a second action of the other object.

14. The computer-readable storage medium according to claim 11, wherein the first probability interaction element comprises a dice.

* * * * *